United States Patent Office 3,373,934
Patented Mar. 19, 1968

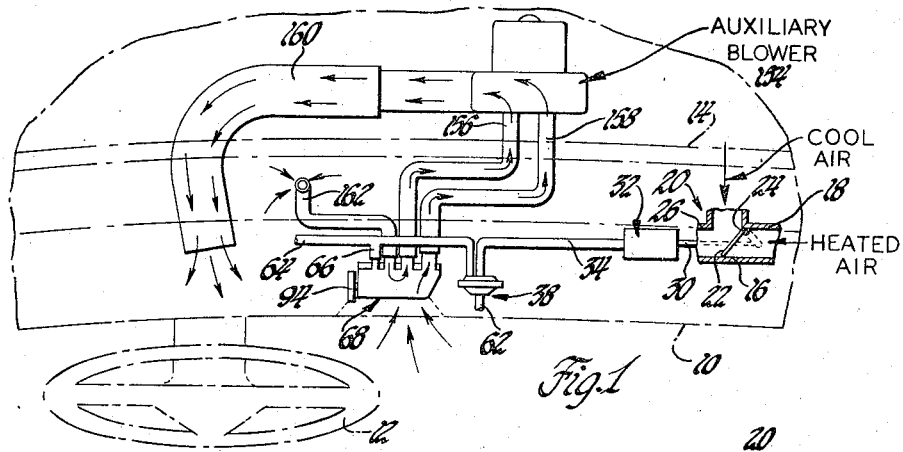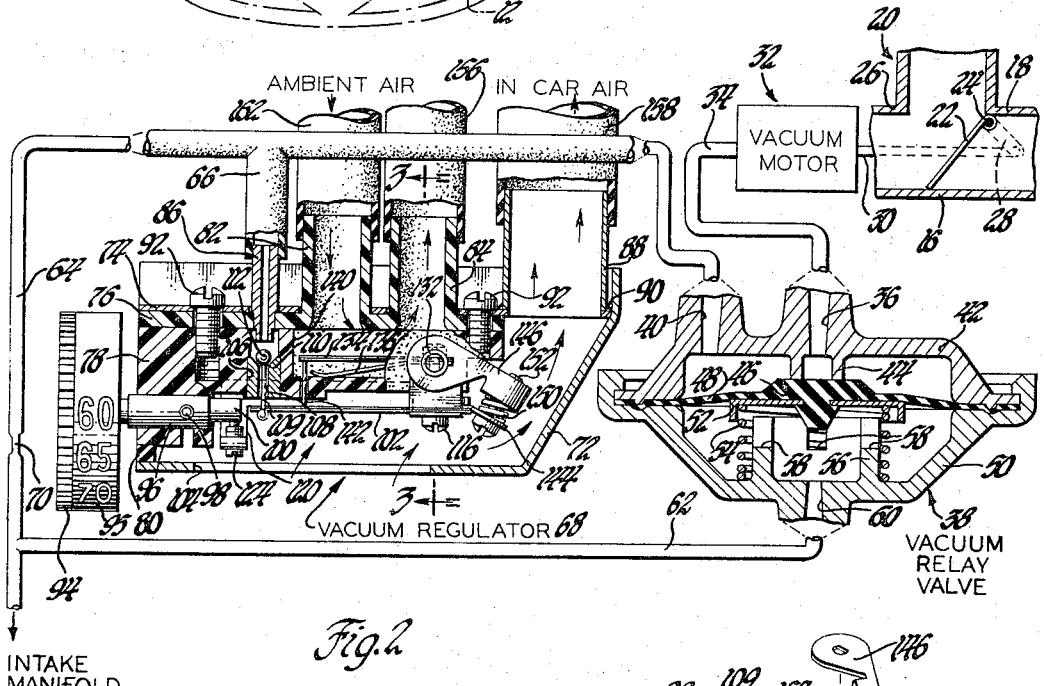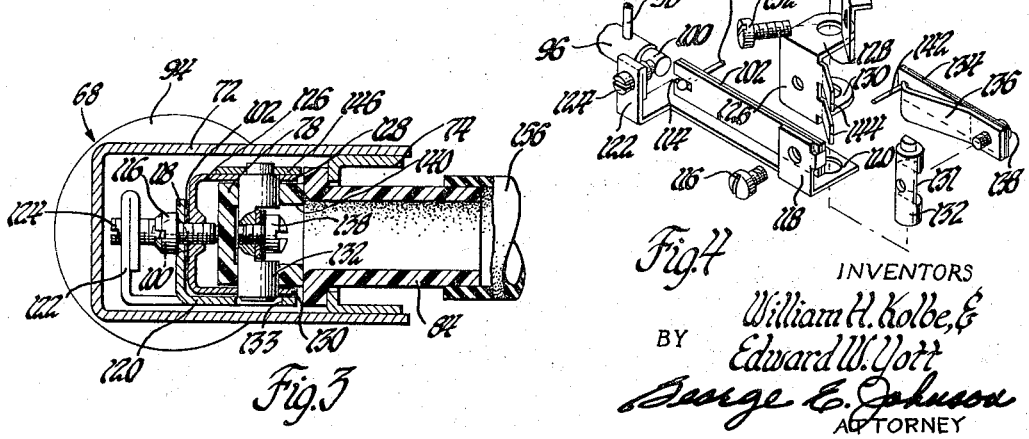

3,373,934
AUTOMOTIVE TEMPERATURE CONTROL SYSTEM WITH INSIDE AND OUTSIDE AIR TEMPERATURE SENSING
William H. Kolbe, Birmingham, and Edward W. Yott, St. Clair Shores, Mich., assignors to General Motors Corporation, Detroit, Mich., a corporation of Delaware
Filed Jan. 26, 1967, Ser. No. 611,928
7 Claims. (Cl. 236—13)

ABSTRACT OF THE DISCLOSURE

This invention relates to systems for automatically controlling the temperature of a passenger compartment in an automobile and includes a vacuum modulating valve for regulating heat flow with that valve being responsive to changes in ambient and in-car air temperatures.

Background of the invention

Systems for controlling the heating or cooling of passenger compartments have heretofore been complicated by details such as electronic components or they have not been promptly responsive to variations in both ambient and in-car temperature as would be desirable. Reasonably prompt as well as accurate modulation and simplicity are obviously desirable characteristics and in this connection, the control element to be actuated in response to condition sensors could be a damper, a valve or some other form of element in which its extent of movement would be such as to correct or maintain in-car temperature in accordance with a change or changes in one or more conditions.

The disclosure in the United States Patent 2,668,014 granted Feb. 2, 1954, in the name of James K. Lund, presents an example wherein a temperature change within a car is detected by a bimetal which in turn modulates the flow of engine coolant to a heater. The response in such a system may be accurate within limitations but it is far from immediate. It should be appreciated that a number of conditions affecting the heating or air conditioning of an automobile changes quickly and often drastically so that problems involved in a suitable control system for an automobile are not met with by control systems employed in other fields.

A vacuum relay valve momentarily stabilizing the working of an electronic control system despite interruptions in a crude vacuum or differential pressure supply necessary to effect operation is disclosed in United States Ser. No. 559,874 filed June 23, 1966, in the name of R. D. Freiberger.

Summary of the invention

Although the system of this invention may be used to control the admission of required proportions of heated and cooled air, it could have other applications such as the control of the amount of heated engine coolant to a heater. One object of the invention is to provide a simple system capable of promptly modulating a differential pressure to reflect changes in ambient and in-car temperature conditions and compensate for them by using that pressure in controlling the in-car temperature.

Description of the drawings

FIGURE 1 is a phantom plan view of a portion of an automotive instrument panel or dash with components of the system embodying the present invention schematically mounted thereon;

FIGURE 2 is a schematic view of the system with certain components therein shown in cross section to illustrate details;

FIGURE 3 is a cross-sectional view looking in the direction of the arrows 3—3 in FIGURE 2; and FIGURE 4 is an exploded view in perspective of details shown in FIGURE 2.

Description of the preferred embodiment

In FIGURE 1, an instrument panel 10 is shown with a steering wheel 12 and a windshield 14 located with relation to the panel. A Y connection 16 in the air ducts of the heating system includes an inlet branch 18 for heated air and an inlet branch 20 for cooler air. A damper or door 22 is pivoted at 24 for suitable positioning so that proper proportions of heated air to cooler air may mix and flow by way of an outlet branch 26 to a distributor (not shown) for the passenger compartment. The door 22 is controlled by a lever 28 linked to a rod 30 adapted to be moved longitudinally by a diaphragm type vacuum motor 32. The latter employs vacuum acting on a diaphragm and opposed by a compressed spring as is well known. A line 34 connects the motor 32 to a port 36 in a vacuum relay valve 38. A second port 40 together with the port 36 is formed in a valve cover 42. A cylindrical skirt 44 encircles the port 36 and depends from the cover so that the skirt may seat on a rubber seat 46 which is integral with a flexible diaphragm 48. The periphery of the diaphragm is clamped between the cover 42 and a main body 50 of the valve. A backing plate 52 moves with the diaphragm and a spring 54 is retained around a skirt 56 integral with the body 50 to act upwardly against the plate. Slots 58 are formed in the skirt. The cover 42 and the body 50 are made of sufficiently resilient material such as plastic so that their rims may be snapped together tightly to hold the margin of the diaphragm 48. The body 50 bears a port 60 which is connected by a line 62 to a source of raw vacuum such as the intake manifold of the car engine. The line 62 is also connected by a line 64 to a branch 66 leading to a vacuum regulator 68. The line 64 also is connected to the port 40 in the vacuum relay valve 38. A restriction 70 is placed in the line 64 between the line 62 and the branch 66.

The regulator 68 includes a box 72 closed at one side by a flanged cover 74 and at one end by plastic elements 76, 78 and 80. The latter is merely a spacer but the element 76 bears two necks 82 and 84 and a smaller nipple 86 all extending through the cover 74. The branch 66 is connected to the nipple 86. A large nipple 88 is welded as at 90 to the cover 74 and is beyond the ends of the elements 72 and 86. Screws 92 are employed to hold the plastic elements 76 and 78 to the cover 74 and means not disclosed are utilized to hold the regulator 68 as a unit to the dash 10 in such a way that a manual adjustment wheel 94 associated therewith and having symbols 95 is within convenient reach of the car operator. This wheel is knurled and is mounted on a shaft 96 to rotate therewith in respect to the element 78. The shaft 96 bears a stop pin 98 to limit its angle of rotation and it also bears an eccentric 100 within the box 72 for flexing a thermally responsive or bimetal element 102. An opening 104 is made in the box 72 for the entry of in-car air.

A bore 106 is formed in the element 78 to connect the nipple 86 with a passage 108 formed in a plug 110. A ball valve 112 is positioned to control the passage 108 and one end of a valve pin 109 is retained in a slot 114 formed in one end of the bimetal 102. The other end of the pin 109 is fixed to the ball or ball valve 112. The other end of the bimetal is held by a screw 116 to a flange 118 turned up from an arm 120. A second flange 122 retains an adjustment screw 124 which contacts the eccentric 100. The screw 116 passes through the flange 118 as well as the bimetal 102 and is threaded into a bracket 126 having ears 128 and 130 on opposite sides of the plastic element 78. A pivot pin 132 (FIGURE 4) is retained in the element 78 and passes into an aperture 133 in the arm 120 and through the ears 128 and 130. A central portion 131 of the pin is flattened to receive one end of a second thermally responsive element or bimetal 134 and one end of a leaf spring 136. A screw 138 holds the three together. A recess 140 is formed in the element 78 to give communication between the necks 82 and 84 and it contains the bimetal 134 and the leaf spring 136. A pin 142 is slidable in the element 78 and its opposite ends abut the bimetals 102 and 134. Two tangs 144 extend from the bracket 126 and an arm 146 is nonrotatively held on and with respect to the top end of the pin 132. A coil spring 150 is held between the tangs 144 and the free end of the arm 146 by a screw 152.

An auxiliary blower 154 is installed in the car to receive air from the neck 84 and the nipple 88 by means of conduits 156 and 158 respectively. This air is forced into the passenger compartment by way of a conduit 160. Outside air is pulled or forced by ram effect through a conduit 162 leading to the neck 82 to a first passage defined by the regulator 68 whereas in-car or passenger compartment air is drawn into the box 72 by way of the opening 104 and caused to flow through a second passage defined by the regulator and leading to the nipple 88.

In the operation of the system and assuming that an adequate raw vacuum is being supplied to the line 62, the vacuum regulator 68 bleeds air into the line 64 between the vacuum motor 32 and the restrictor 70 whereby the air mix damper 22 is varied in position in accordance with a sensed temperature. The forces acting on the ball 112 are balanced. Vacuum tends to pull it open, and the combined forces of the bimetal 102 sensing in-car air temperature and that of the bimetal 134 sensing ambient air temperature acting through the pin 142 tends to close it. The driver's manual control is the wheel 94 whereby he is enabled to rotate the cam 100 and change the effective force on the ball 112 through the pin 109, i.e., to select a desired passenger compartment temperature.

The blower 154 must be used to force the air back into the passenger compartment because, if the air were piped to the outside and the car windows were open, the flow of air through conduits 156 and 158 would otherwise possibly be reversed and prevent the desired sensing and operation.

The vacuum relay valve 38 is essential as a definite vacuum is required to seat the ball 112 under given temperature conditions. If the engine manifold vacuum should diminish as when climbing a steep grade, the valve 38 closes and holds the air mix damper 22 in its attained position until a required vacuum in line 64 is re-established.

Two bimetal sensors 102 and 134 are used for, as an example, a 0° ambient day and a 100° ambient day requires different positions for the damper in maintaining a 75° temperature in the passenger compartment. The ambient air sweeps over the sensor or bimetal 134 and the in-car air sweeps over the sensor or bimetal 102. The result is a low-cost, simple and prompt response control system. Relative adjustment of the two bimetals is conveniently had by use of the screws 152 and 116 with the help of the springs 150 and 136.

The purpose of the restriction 70 is to limit the amount of vacuum used at any time by the system. The vacuum effective to move the damper 22 is varied by the amount of air admitted through the clearance space 108 around the pin 109. The vacuum relay valve 38 is essential, as a practical matter for automobile use, but it may be dispensed with and the lines 64 and 34 be directly connected if one were to be content with proper operation at times other than during full throttle or high intake manifold absolute pressures. If the crude vacuum supply drops unduly as during climbing a steep hill, and with the relay valve 38 preferably used, the spring 54 will seat the diaphragm seat 46 on the skirt 44 and hold the attained position of the damper 22.

We claim:

1. An automotive temperature control system for an automobile having a passenger compartment, said system comprising a heat regulating element such as a damper, a vacuum motor linked to said element, a vacuum line connected to a source of vacuum supply and to said vacuum motor, a vacuum regulator defining a first passage for ambient air and a second passage for in-car air, two thermally responsive elements, one of the latter being in each of said passages, a valve for admitting air to said vacuum line, blower means arranged to discharge air from said passages into said compartment, and said valve being controlled by said thermally responsive elements to actuate said heat regulating element through said vacuum motor.

2. A control system as set forth in claim 1, said two thermally responsive elements being bimetal elements, and means for adjusting said bimetal elements whereby a temperature in said passenger compartment may be selected.

3. A control system as set forth in claim 1, and adjustment means connected to said thermally responsive elements whereby a predetermined temperature in said passenger compartment may be manually selected and automatically maintained.

4. A control system as set forth in claim 1, a vacuum relay valve being in said vacuum line to stabilize action of said vacuum motor.

5. A control system as set forth in claim 1, a vacuum relay valve being in said vacuum line leading to said motor, a restrictor in said vacuum line between said vacuum source and said vacuum motor, and a line connecting said source to said relay valve whereby an undue loss of vacuum at said source will cause said relay valve to close said vacuum line leading to said motor.

6. A control system as set forth in claim 1, said vacuum regulator being mounted on the dash of said automobile and said blower means being a single blower.

7. A control system as set forth in claim 1, said heat regulating element being an air-mix damper controlling the proportion of heated air and cooler air admitted to said passenger compartment.

References Cited

UNITED STATES PATENTS 2,868,459  1/1959  Modes _____ 236—87
3,333,770  8/1967  Freiberger _____ 236—87 X ROBERT A. O'LEARY, *Primary Examiner.*

W. E. WAYNER, *Assistant Examiner.*